(12) United States Patent
Walker et al.

(10) Patent No.: US 8,954,346 B1
(45) Date of Patent: Feb. 10, 2015

(54) SERVING FORM ADS WITH A VIDEO

(71) Applicant: Inadco, Inc., Palo Alto, CA (US)

(72) Inventors: James N. Walker, Palo Alto, CA (US); Patrick Mee, San Mateo, CA (US); Hung The Duong, Palo Alto, CA (US)

(73) Assignee: Inadco, Inc., Palo Alto, CA (US)

( * ) Notice: Subject to any disclaimer, the term of this patent is extended or adjusted under 35 U.S.C. 154(b) by 0 days.

(21) Appl. No.: 13/908,896

(22) Filed: Jun. 3, 2013

(51) Int. Cl.
| | | |
|---|---|---|
| *G06Q 30/00* | (2012.01) | |
| *H04N 7/10* | (2006.01) | |
| *H04N 21/435* | (2011.01) | |
| *G06Q 30/02* | (2012.01) | |
| *H04N 21/81* | (2011.01) | |
| *H04N 21/6587* | (2011.01) | |
| *H04N 21/658* | (2011.01) | |
| *G06F 3/00* | (2006.01) | |
| *G06F 13/00* | (2006.01) | |
| *H04N 7/173* | (2011.01) | |
| *G06F 17/00* | (2006.01) | |
| *G06F 3/048* | (2013.01) | |
| *H04N 9/80* | (2006.01) | |
| *H04N 5/783* | (2006.01) | |

(52) U.S. Cl.
CPC ......... *H04N 21/435* (2013.01); *G06Q 30/0271* (2013.01); *G06Q 30/0251* (2013.01); *G06Q 30/0261* (2013.01); *G06Q 30/0257* (2013.01); *G06Q 30/0255* (2013.01); *G06Q 30/0269* (2013.01); *G06Q 30/0241* (2013.01); *H04N 21/812* (2013.01); *H04N 21/6587* (2013.01); *H04N 21/6581* (2013.01)

USPC .................. 705/14.67; 705/14.43; 705/14.53; 705/14.54; 705/14.55; 705/14.58; 705/14.66; 725/32; 725/34; 725/42; 725/46; 725/60; 725/87; 725/35; 715/221; 386/249; 386/343

(58) Field of Classification Search
CPC .......... H04N 21/6581; H04N 21/6587; H04N 21/812; G06Q 30/0241; G06Q 30/0269; G06Q 30/0255; G06Q 30/0257; G06Q 30/0261; G06Q 30/0251
USPC .......... 705/14.43, 14.53, 14.54, 14.55, 14.58, 705/14.66, 14.67; 725/32, 34, 35, 42, 46, 725/60, 87; 715/221, 867; 386/249, 343
See application file for complete search history.

(56) References Cited

U.S. PATENT DOCUMENTS

| | | | |
|---|---|---|---|
| 6,748,397 B2 * | 6/2004 | Choi ..................... 1/1 |
| 2002/0174430 A1 * | 11/2002 | Ellis et al. ........... 725/46 |
| 2003/0023482 A1 * | 1/2003 | Messner et al. ............ 705/14 |
| 2010/0069157 A1 * | 3/2010 | Fujimoto ........... 463/42 |
| 2010/0088155 A1 * | 4/2010 | Pyle et al. ........... 705/10 |
| 2010/0161416 A1 * | 6/2010 | Chung et al. ............ 705/14.53 |
| 2011/0270680 A1 * | 11/2011 | Lim ............ 705/14.58 |
| 2012/0095837 A1 * | 4/2012 | Bharat et al. ............. 705/14.54 |
| 2012/0110620 A1 * | 5/2012 | Kilar et al. ............ 725/34 |
| 2013/0091013 A1 * | 4/2013 | Wang et al. ........... 705/14.53 |

* cited by examiner

*Primary Examiner* — Hoang-Vu A Nguyen-Ba

(74) *Attorney, Agent, or Firm* — Van Pelt, Yi & James LLP

(57) ABSTRACT

Serving form ads with videos is disclosed, including: receiving from a client device a request including a set of parameters associated with a video; and determining a form ad to be displayed with the video based at least in part on the set of parameters.

20 Claims, 13 Drawing Sheets

SERVING FORM ADS WITH A VIDEO

BACKGROUND OF THE INVENTION

Video websites are common and tend to attract many visitors. At a webpage of a certain video, the video is played in a video player application. The user may control the playback of the video by selecting one or more playback related controls, such as play, pause, stop, and skip to a different portion of the video. Sometimes, ads are displayed on the same webpage as the video player. Typical ads that are displayed on the same webpage as a video player include banner ads or video-based ads.

BRIEF DESCRIPTION OF THE DRAWINGS

Various embodiments of the invention are disclosed in the following detailed description and the accompanying drawings.

DETAILED DESCRIPTION

Figure 1:
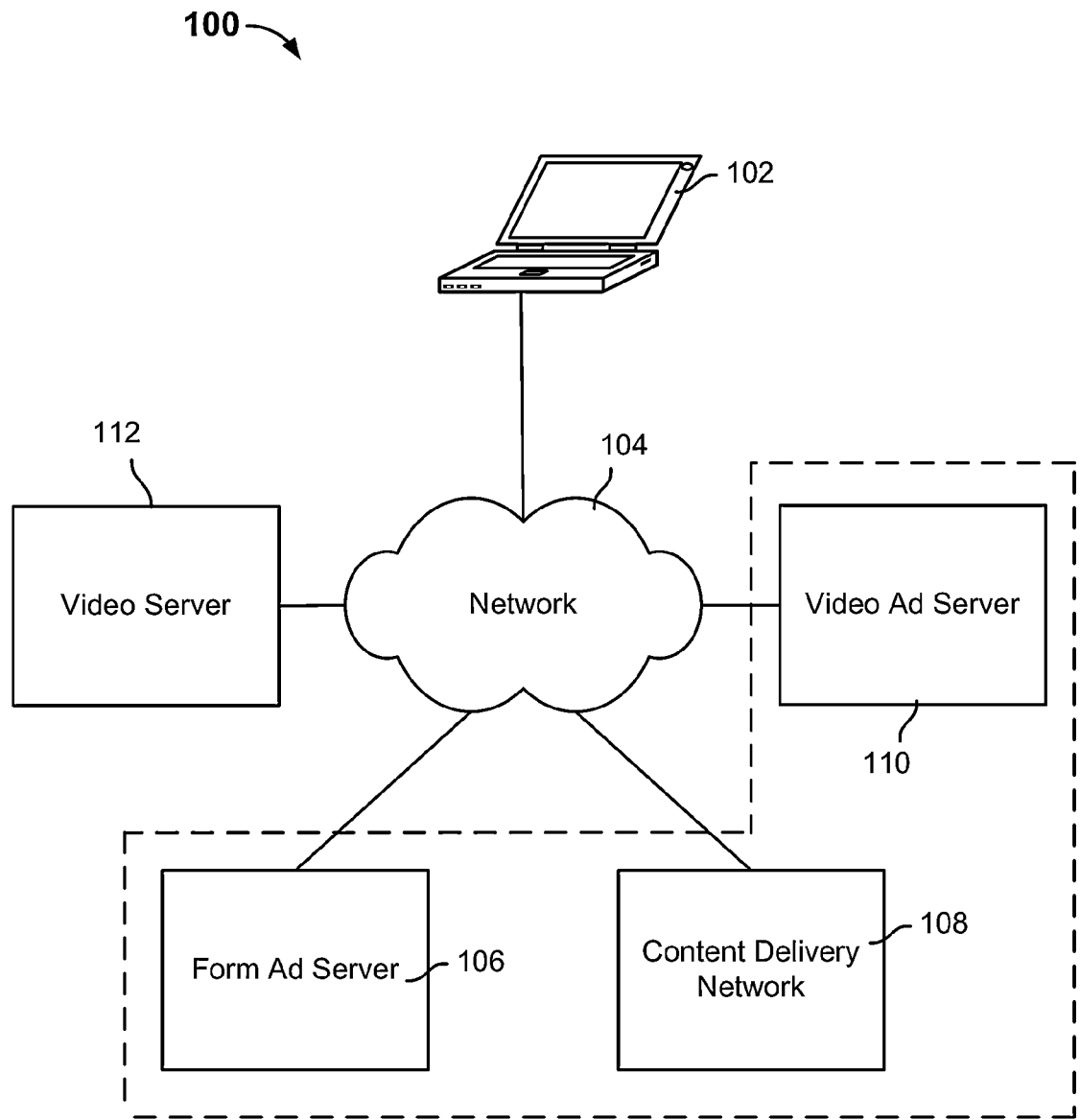
FIG. 1 is a diagram showing an embodiment for a system for serving form ads with a video.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of serving form ads with videos are described herein. In various embodiments, a video selected by a user is to be played in a video player application. The video player application may be embedded in a webpage or a software application (e.g., configured to be used with a mobile platform). The video player application may be executing at a client device. In various embodiments, the client device sends a request including a set of parameters associated with the video to a server. For example, the parameters included in the set may include data associated with the user, data associated with the video, data associated with the client device, data associated with the video player, data associated with the user interaction with the video, and/or data associated with the geographic location of the user. In some embodiments, the request including the set of parameters is sent to the server in response to a certain video playback event (e.g., the user pauses the playback of the video or the playback of the video completes). Based on the set of parameters, a form ad is selected and sent to the client device, where the form ad is to be displayed with the video.

In various embodiments, "form ads" comprise cost per lead advertisements displayed as forms at webpages and/or within applications, where user information may be submitted through one or more fields and/or selections of the form to potentially be stored as a lead. In various embodiments, a form ad may be implemented as an application that enables advertisers to engage with consumer users (e.g., a displayed form ad allows consumer users to interact with the form) and also enables the collection/storage of information received from the consumer users. A form ad may solicit for information such as one or more of the following examples: name, address, contact information (e.g., email and/or phone number), educational background, credit score, income level, whether the consumer user has one or more types of insurance, and/or other qualifying information and/or other personal information. The information solicited by the form ad may be collected and used to, for example, include the solicited user in a mailing list, include the user in a reward program, query the user, qualify the user for a service, redirect the user to an appropriate landing page and/or website, and/or include the user in a queue of users to be contacted by an advertiser associated with the form ad.

In various embodiments, a "lead" refers to a verified set of user information. In some embodiments, user information that meets the criteria required to classify the user information to be a lead includes one or both of the user information satisfying successful validation (e.g., validation of the format of the input information) and/or satisfying successful verification (e.g., where the verification process is performed using at least a third party information verification service). In some embodiments, the user information that meets the criteria required to classify the user information as a lead is stored as a lead. But the user information that does not meet the criteria is discarded and not stored. In some embodiments, a stored lead is compared against sets of purchase criteria configured by one or more buyers. A lead that meets the purchase criteria configured by a particular buyer may be eligible to be sold to that buyer, whereas a lead that does not meet the purchase criteria is not eligible to be sold to that buyer. In some embodiments, a buyer may be billed for each stored lead (i.e., each verified set of user information) that meets the buyer's configured purchase criteria, which is to say that the buyer is not billed for the sets of user information that are input but either not validated or not verified or the sets of user information that are both validated and verified but do not meet purchase criteria.

FIG. 1 is a diagram showing an embodiment for a system for serving form ads with a video. In the example, system 100 includes client device 102, network 104, form ad server 106, content delivery network 108, video ad server 110, and video server 112. Network 104 includes high-speed data networks and/or telecommunications networks. Although form ad server 106, content delivery network 108, and video ad server 110 are shown as separate entities in the example, in some embodiments, the functions associated with form ad server 106, content delivery network 108, and video ad server 110 may be implemented on a single server.

Client device 102 is configured to communicate with form ad server 106, content delivery network 108, video ad server 110, and video server 112 over network 104. While client device 102 is shown to be a laptop computer in the example, other examples of client device 102 include a desktop computer, a tablet device, a smartphone, a mobile device, and/or any other computing device. In various embodiments, a web browser application is installed at client device 102.

In some embodiments, an advertiser user (e.g., a user who wishes to place an advertisement with a publisher) and/or a buyer user (e.g., a user who wishes to buy a lead received from a form ad) may use a client device such as client device 102 to access a user interface of an application provided by form ad server 108 that enables the user to create, configure, customize, and store form ads to be displayed with search results. A buyer may or may not be related to the advertiser party that runs an advertisement campaign. For example, the advertiser and/or buyer user may access such a user interface by accessing the appropriate uniform resource locator (URL) of the application provided by form ad server 106. In some embodiments, the user interface is configured to enable the advertiser and/or buyer user to perform one or more of the following: create the appearance of a form ad, configure the publishers (e.g., the type of online video platforms) at which the created form ad is to be displayed, configure one or more keywords to be associated with the form ad, configure one or more categories to be associated with the form ad, configure criteria required for the user information input at the form ad to be classified as a lead, configure target user demographics the form ad is intended for, configure the specific videos and/or categories of videos that the form ad is intended for, configure the purchase criteria required for user information input at the form ad to be classified as a lead, configure how much the buyer is willing to be charged for a lead associated with the form ad, configure the budget to be used for an ad campaign associated with the form ad, configure one or more goals (e.g., filters) for a desired lead (e.g., a goal may describe a desirable lead that the buyer is willing to pay for), configure mappings between fields of the form ads and variables used by another system used by the advertiser, and configure whether a pixel is to be included in the form ad to track uses and/or performance of the form ad. The form ads may then be stored, for example, at content delivery network 108 and their respective metadata may be stored at, for example video ad server 110. The form ads may be served at one or more publishers (e.g., online video platforms). In some embodiments, the stored form ads may be displayed at a webpage of an online video platform hosted by video server 112. In some embodiments, the stored form ads may be displayed with a mobile device optimized software application associated with an online video platform hosted by video server 112.

A user may use client device 102 to select a video provided by an online video platform supported by video server 112 that he or she wishes to watch. For example, the online video platform comprises a website that hosts videos uploaded and shared among users. The selected video is played back in a video player application associated with the online video platform. The user may select various selectable elements associated with the video player application to control the playback of the video. For example, selectable elements may include a play button, a pause button, a stop button, and/or a control for skipping to various portions of the video. When the playback of the video reaches a certain playback event, the video player associated with client device 102 is configured to send a request for a form ad to video ad server 110. In various embodiments, the request includes a set of parameters associated with the viewing user, the video, the client device, and/or the video player. The playback event that triggers the sending of the request may be configurable to comprise any type of event related to the playback of the video. Examples of playback events include the completion of the video playback (i.e., the playback of the video reaches the end of the video) and a pause (e.g., that is initiated by the user or by another entity) in the playback of the video. In various embodiments, playback event(s) that are associated with a pause or another stopping point in the video are selected to serve as triggers to send the request for a form ad so that a returned form ad may be displayed for the user while the user will more likely focus attention and time to complete the form ad. The set of parameters may be collected by the video player application executing at client device 102 and/or the web browser application executing at client device 102. For example, the parameters included in the set may include data associated with the user, data associated with the video, data associated with the client device, data associated with the video player, data associated with the user interaction with the video, and/or data associated with the geographic location of the user. User interaction with the video may include user interaction with one or more companion ads, banner ads, video ads, and overlay ads displayed on the webpage and/or application associated with the video. For example, user interaction associated with ads may include muting the sounds associated with the ads, closing/dismissing the ads, skipping the ads, and/or replaying the ads.

In response to receiving a request for a form ad from a client device such as client device 102, video ad server 110 is configured to determine an appropriate form ad based on the set of parameters included in the request and metadata associated with various form ads. In various embodiments, video ad server 110 is configured to include a database storing metadata associated with various form ads. For example, the metadata associated with each form ad may include keywords associated with the form ad, categories associated with the form ad, size dimensions (e.g., length and width) of the form ad, types of networks devices associated with the form ad, target user demographics associated with the form ad, a popularity associated with the form ad, a time associated with when the form ad first became available, geographic data associated with the form ad (e.g., geographic data associated with the form ad may indicate which geographic areas the form ad is best suited for), client device agent compatibility data (e.g., client device agent compatibility data may indicate which types of web browser applications and/or operation systems the form ad is capable of being displayed ad), and online video platforms associated with the form ad (e.g., websites associated with the form ad may comprise specific video websites and/or types of video websites at which the form ad may be displayed). In some embodiments, video ad server 110 is configured to determine the appropriate form ad for a request based on determining user intent based on the set of parameters and determining a best matching form ad based on the metadata associated with the form ads. In some embodiments, video ad server 110 is configured to determine the appropriate form ad for a request based on categorizing the viewing user into a user demographic and determining a best matching form ad for that user demographic. In some embodiments, video ad server 110 uses machine learning to predict the most appropriate user demographic for a user. In some embodiments, video ad server 110 is configured to determine the appropriate form ad for a request by selecting a form ad that is currently popular. In some embodiments, after video ad server 110 determines the appropriate form ad, video ad server 110 is configured to send data associated with the selected form ad directly to client device 102. In some instances, video ad server 110 may determine that no form ad is to be displayed with the video at all. For example, video ad server 110 may detect that the user is not interested in viewing/interacting with ads based on the collected user interaction so far that indicates the user has dismissed at least some of the other ads displayed in association with the video so far. In some embodiments, after video ad server 110 determines the appropriate form ad, video ad server 110 is configured to send identifying information associated with the selected form ad to client device 102 so that client device 102 can use the identifying information to request the selected form ad from another server. For example, the identifying information comprises an identifier associated with the form ad and/or a uniform resource locator (URL) associated with identifying the location of the form ad.

In some embodiments, client device 102 is configured to receive identifying information associated with a form ad selected by video ad server 110. Client device 102 is configured to send a request including the identifying information for the data associated with the form ad to content delivery network 108. In some embodiments, content delivery network 108 is configured to store data associated with various form ads, the metadata for some of which is stored at video ad server 110. Based on the received request from client device 102, content delivery network 108 is configured to send the data (e.g., image, fields, and/or selections) associated with the form ad identified by the identifying information included in the request.

Client device 102 is configured to display the form ad for which data was returned from content delivery network 108 or video ad server 110. In various embodiments, the form ad is displayed in a manner that overlays at least a portion of the video or video player. In some embodiments, the form ad is displayed at a particular location (e.g., ad unit) on the webpage or the application associated with the video that does not overlay a portion of the video or video player. For example, the form ad will remain displayed until the video resumes (e.g., after the video was paused), the form ad is dismissed/closed by a user selection, and/or user information is input through the form ad. While the form ad is displayed, the user may complete at least some of the fields and/or selections of the form ad with user information. Each form ad may include a control (e.g., a submit button) that the user may select to submit the user information. The user information input into the form ad may be sent by client device 102 to form ad server 106.

Form ad server 106 is configured to receive the user information input into a displayed form ad from a client device such as client device 102. In some embodiments, form ad server 106 is configured to determine whether the user information input in the form ad meets the criteria required to classify the user information to be a lead (e.g., the criteria may be those configured by the advertiser user that created the form ad or a buyer user that may potentially buy a lead that is received through the form ad). In some embodiments, such criteria may include validation of the format and/or type of user information that is input into each field of the form ad (e.g., for example, if Roman alphabetical characters were input into a field associated with a phone number, then the input information would be deemed as invalid). In some embodiments, such criteria may also include verification of the user information to detect for fraudulent information (e.g., fraudulent information may include an inputted email address that does not actually exist or an inputted name information that does not match the name of the owner of the inputted email address). In some embodiments, validation and/or verification of the user information may be performed while more user information is still being input by a user or performed after all user information has been completely input and submitted. In some embodiments, a form ad's configurable criteria required to classify the user information to be a lead may include: what type of validation to perform; which events trigger the start of validation and/or verification; which type of verification to perform (e.g., which third party verification is to be used); whether a timeout period is to be set for waiting on the results of the verification process and if so, the length of the timeout period; the number of times to prompt for resubmission of user information at one or more fields of the form ad (e.g., because user information from a previous submission is deemed to be not validated and/or not verified) before sending a receipt of acknowledgement despite not yet having received validated and/or verified user information.

In some embodiments, form ad server 106 is configured to perform validation and/or verification of the user information input at the form ad. In some embodiments, form ad server 106 is configured to send at least some of the user information to be verified by a third party verification server (not shown). Examples of verification services include eBureau® and TARGUSinfo®. In some embodiments, form ad server 106 is configured to send user information (e.g., user information that has already been successfully validated) to a third party verification server for the third party verification server to perform verification by, for example, checking the user information (or portions thereof) against database(s) of verified consumer information (e.g., names, email addresses, and phone numbers that are known to exist and belong to real people). In some embodiments, once the third party verification server determines whether the user information can be successfully verified, the third party verification server sends a verification result message back to form ad server 106. For example, the verification result message may include whether the user information has been or has not been successfully verified and the likelihood that the user associated with the user information is going to make a transaction in one or more verticals (e.g., categories of commerce).

In some embodiments, once form ad server 106 makes the determination of whether the user information meets the criteria required to classify the user information as a lead, form ad server 106 stores the set of user information as a lead if the criteria are met and form ad server 106 does not store the set of user information as a lead if the criteria are not met. In some embodiments, stored leads are used to train the models used to select form ads. In some embodiments, form ad server 106 is configured to determine whether stored leads match one or more purchase criteria configured by a buyer of leads. If the lead does not match a set of purchase criteria, then the stored lead may become discarded. In some embodiments, form ad server 106 is configured to score each stored lead based on one or more attributes of the user information of the lead. In some embodiments, form ad server 106 is configured to bill a buyer periodically based on the number of stored leads that match the buyer's configured purchase criteria during that period.

In some embodiments, once user information is input at a displayed form ad at a webpage and/or application associated with a video, regardless of whether the user information meets the validation and/or verification criteria, form ad server 106 is configured to pass the user information to an advertiser server (not shown). In some embodiments, the advertiser server is associated with the form ad (e.g., a user associated with the advertiser server may have created the form ad) and may determine an appropriate landing page associated with the submitted user information. For example, the landing page may include a webpage and/or application that includes information that matches at least a portion of the submitted user information. For example, if the form ad solicited for information associated with a user's current location and interest in taking out a mortgage and the user submitted a Michigan state zip code, then the landing page may display potential interest rates on mortgages offered by a bank in Michigan. In some embodiments, the advertiser server is configured to send content associated with the determined landing page to client device 102 such that a web browser installed at device client 102 may present the determined landing page to the user (in a new window). In some embodiments, the advertiser server may track the user's activities (e.g., whether the user performed a transaction) at the landing page or the website associated with the landing page and may transmit some of such information back to form ad server 106. In some embodiments, form ad server 106 may use the received information associated with the user's activities at the landing page (or a website thereof) to update one or more models it uses to select an appropriate form ad.

In some embodiments, video ad server 110, content delivery network 108, and form ad server 106 may be implemented across one or more servers and also operated by one or more parties.

Figure 2:
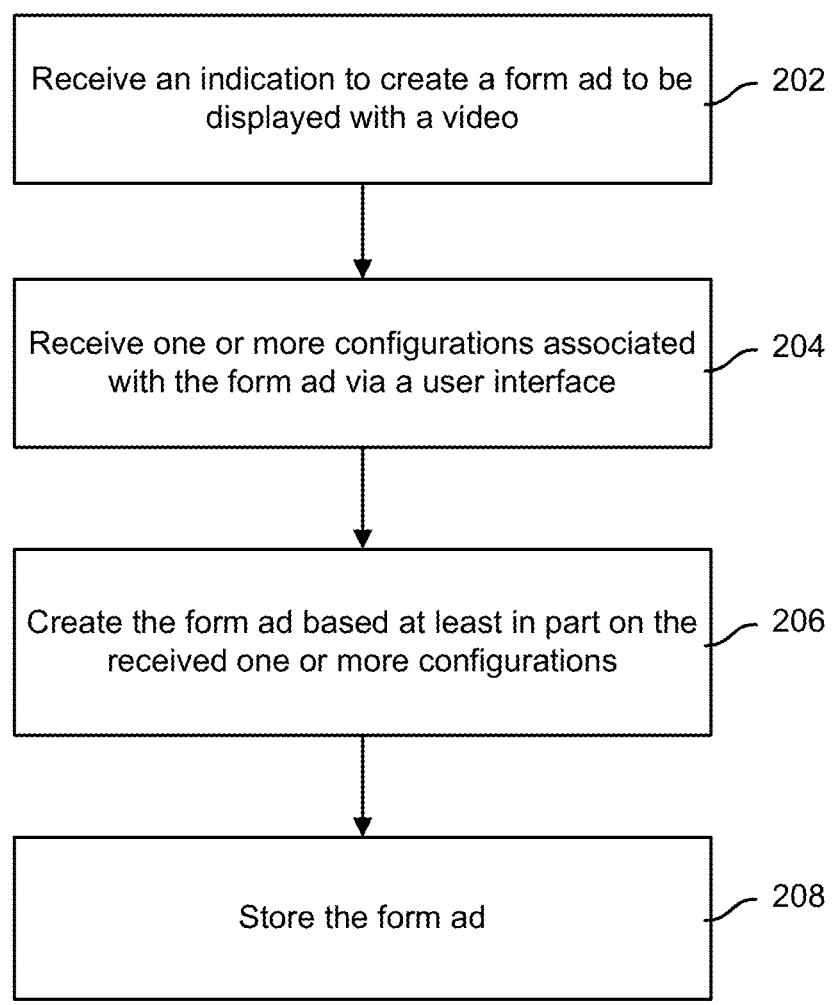
FIG. 2 is a flow diagram showing an embodiment of a process for creating a form ad.

FIG. 2 is a flow diagram showing an embodiment of a process for creating a form ad. In some embodiments, process 200 may be implemented at system 100 of FIG. 1.

At 202, an indication to create a form ad to be displayed with a video is received. In some embodiments, an indication can be associated with a selection at a user interface for the creation and configuration of form ads.

At 204, one or more configurations associated with the form ad are received via a user interface. In some embodiments, the user interface presents a user (e.g., an advertiser and/or buyer user) with options to create various configurations to be associated with the form ad, such as for example, one or more of the following: create the appearance of a form ad (e.g., to be associated with a particular ad campaign and a particular ad group associated with that ad campaign), configure the publishers (e.g., online video platforms) with which the created form ad is to be displayed, configure one or more keywords to be associated with the form ad, configure one or more domains (e.g., websites) to be associated with the form ad, configure one or more categories to be associated with the form ad, configure one or more manners in which the form ad is to be displayed and in which manner based on which conditions, configure the criteria required for user information input at the form ad to be classified as a lead, configure target user demographics the form ad is intended for, configure the specific videos and/or categories of videos that the form ad is intended for, configure how much the advertiser and/or buyer user is willing to be charged for a lead associated with the form ad, configure the budget to be used for an ad campaign associated with the form ad, configure one or more purchase criteria for a lead, configure mappings between fields of the form ads and variables used by another system used by the advertiser and/or buyer user, and configure whether a pixel is to be included in the form to track uses and/or performance of the form ad.

At 206, the form ad is created based at least in part on the received one or more configurations.

At 208, the form ad is stored. In some embodiments, the created form ad is stored with at least some of the user configurations generated at the user interface. In some embodiments, at least some of the configurations associated with a form ad are also referred to as metadata associated with the form ad.

Figure 3:
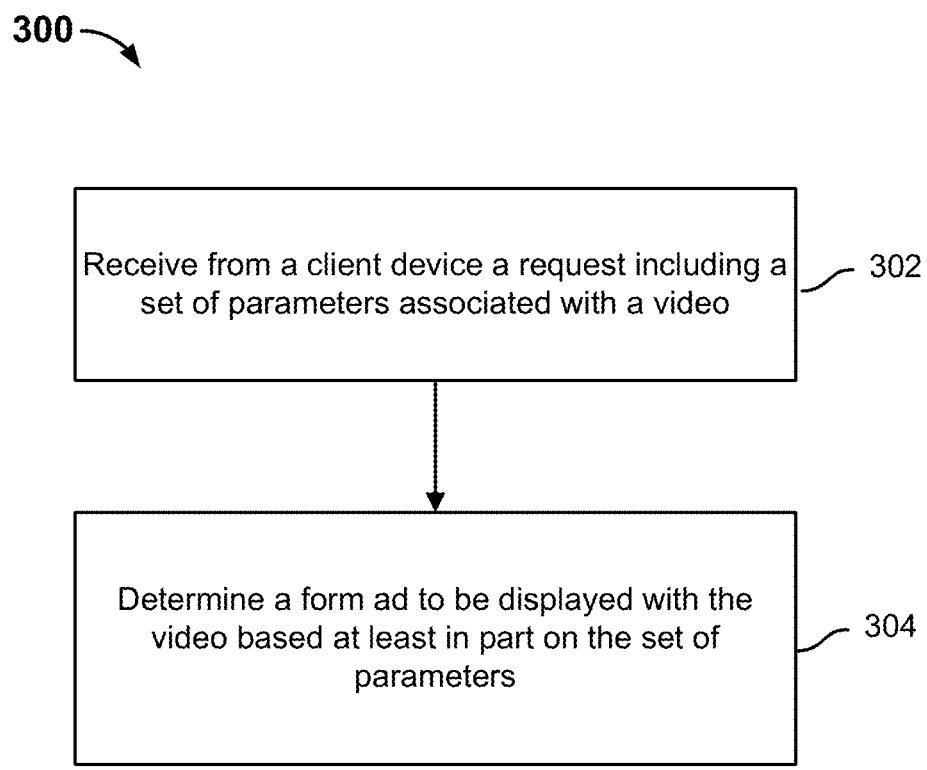
FIG. 3 is a flow diagram showing an embodiment of a process for serving form ads with a video.

FIG. 3 is a flow diagram showing an embodiment of a process for serving form ads with a video. In some embodiments, process 300 is implemented at system 100 of FIG. 1.

At 302, a request including a set of parameters associated with a video is received from a client device. The client device includes a web browser application or other type of application that is used to view a video provided by an online video platform. For example, the video is downloaded or streamed by a video player application at a webpage and/or application associated with the online video platform. In some embodiments, various parameters associated with the user who has selected to view the video, parameters associated with the video itself, parameters associated with the video player, and/or parameters associated with the client device are collected by the video player (or another application that is installed at the client device). For example, parameters associated with the user may include information stored by the web browser (and/or client device) such as the user's geographic location, the user's birthday, the user's gender, and the user's interactions with the video and/or the webpage associated with the video and/or application associated with the video. Examples of the user's interaction include where the user places the cursor on the webpage associated with the video and/or application associated with the video, how the user controls the playback of the video (e.g., whether the user rewind to certain portions of the video or whether the user skip ahead without watching all of the video), and how the user interacts with displayed ads at the webpage associated with the video (e.g., does the user engage with other ads that have been displayed or does the user dismiss the other ads?). For example, parameters associated with the video may include metadata associated with the video (e.g., keywords, tags, user comments, categories, and/or other user generated content), the context associated with the video (e.g., the dimensions of the video, the website at which the video is being played). Examples of parameters associated with the client device include the version/type of the web browser application that is used and the version/type of the operating system that is used at the client device.

In some embodiments, the video player (and/or other application) collects parameters until it receives an indication associated with a playback event that is configured to trigger the transmission the parameters collected so far.

At 304, a form ad to be displayed with the video is determined based at least in part on the set of parameters. The set of parameters is analyzed to determine which form ad to display with the video. In some embodiments, a preliminary determination is made as to whether a form ad is to be displayed at all based on the set of parameters. For example, if no form ad can be found to match the parameters included in the set, then a message indicating that no form ad is to be displayed is returned to the client device and no form ad will be displayed. In another example, if the set of parameters indicates that the user has dismissed every ad so far that was shown to the user at the webpage associated with the video and/or application associated with the video, then it may be presumed that the user will not choose to interact with the form ad and so a message indicating that no form ad is to be displayed is returned to the client device and no form ad will be displayed. If the preliminary determination indicates that a form ad is to be served, than an appropriate form ad is determined based on the set of parameters and sent to the client device. The client device may display the form ad in a manner that overlays at least a portion of the video or video player or at another location on the webpage and/or application associated with the video. A user may complete the fields and/or selections included in the form ad and select a control associated with submitting the user information. For example, the questions/fields/selections in the form ad may solicit the user for personally identifiable information and/or the user's feedback for the video.

Figure 4:
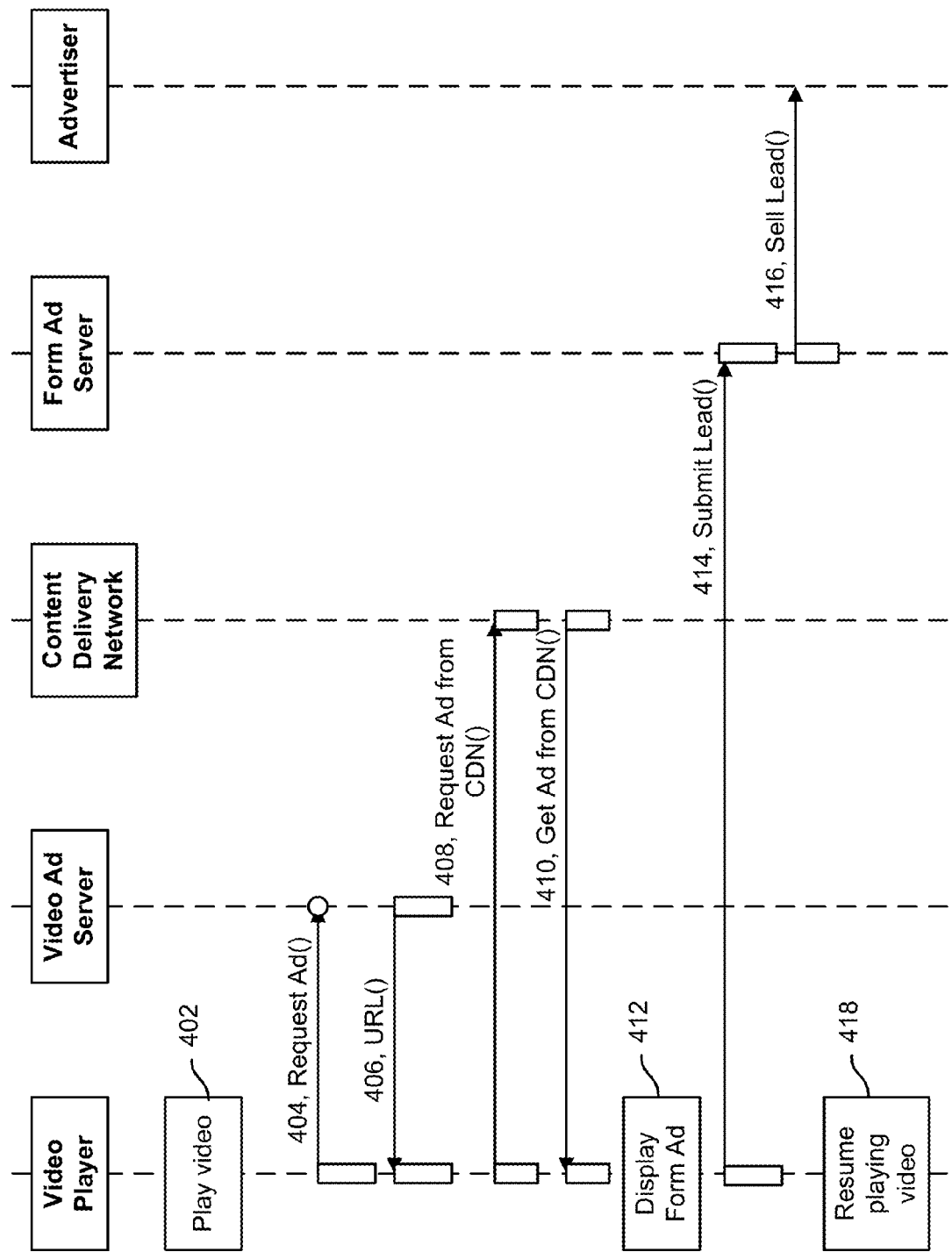
FIG. 4 is a sequence diagram showing an example of serving form ads with a video.

FIG. 4 is a sequence diagram showing an example of serving form ads with a video. In some embodiments, the example of FIG. 4 is implemented with system 100 of FIG. 1. At 402, a video that has been selected by a user to view is being played back at a video player application. For example, the video player application is associated with a webpage of the selected video and the webpage is being viewed using a web browser application executing at a client device such as client device 102 of FIG. 1. In another example, the video player application is associated with a mobile device optimized software application executing at a client device such as client device 102 of FIG. 1. In some embodiments, prior to, during, and subsequent to the playback of the video, parameters such as data associated with the video, data associated with the client device, data associated with the video player, data associated with the user interaction with the video, and/or data associated with the geographic location of the user are being collected by the video player (or another application). For example, the set of parameters may include the type of the form ad that is requested, the amount of the video played back so far, and a geographic area at which the client device is predicted to be located. At 404, the video player sends a request for a form ad to a video ad server such as video ad server 110 of FIG. 1. For example, the video player sends the request for a form ad in response to detecting a playback event that is configured to trigger the transmission of the request. The playback event may be a user selection of the pause control at the video player. The request for the form ad includes the set of parameters collected so far. The video ad server uses at least a subset of the set of parameters included in the request to select an appropriate form ad to be displayed with the video. At 406, the video ad server returns a URL that is configured to be used to locate the form ad to the video player. After receiving the URL associated with the selected form ad, at 408, the video player is configured to send a request for the data associated with the selected form ad from a content delivery network such as content delivery network 108 of FIG. 1. The request for the data associated with the selected form ad includes the URL returned by the video ad server. At 410, the content delivery network returns the data associated with the selected form ad to the video player. For example, the data associated with the form ad comprises the data that the client device is configured to use to display the form ad. At 412, the form ad is displayed with the video. For example, the form ad is displayed over at least a portion of the video or video player and/or in an ad unit of the webpage and/or application associated with the video. The user may complete the fields and/or selections of the form ad (while the video remains paused). At 414, the user information (a lead) is submitted to a form ad server such as form ad server 106 (in response to a user selection of the submit button associated with the form ad). At 416, the lead may be sold to an advertiser in the event that the lead meets the purchase criteria associated with the advertiser. As will be further described below, prior to submitting the lead to the advertiser, the form ad server validates and/or verifies the user information included in the lead to confirm that the user information meets the criteria associated with qualifying as a lead that can be submitted to the advertiser (or another buyer). At 418, the playback of the video is resumed (in response to a user selection to resume the paused video). The form ad may remain displayed until the user dismisses it (by selecting an icon associated with closing the form ad).

Figure 5:
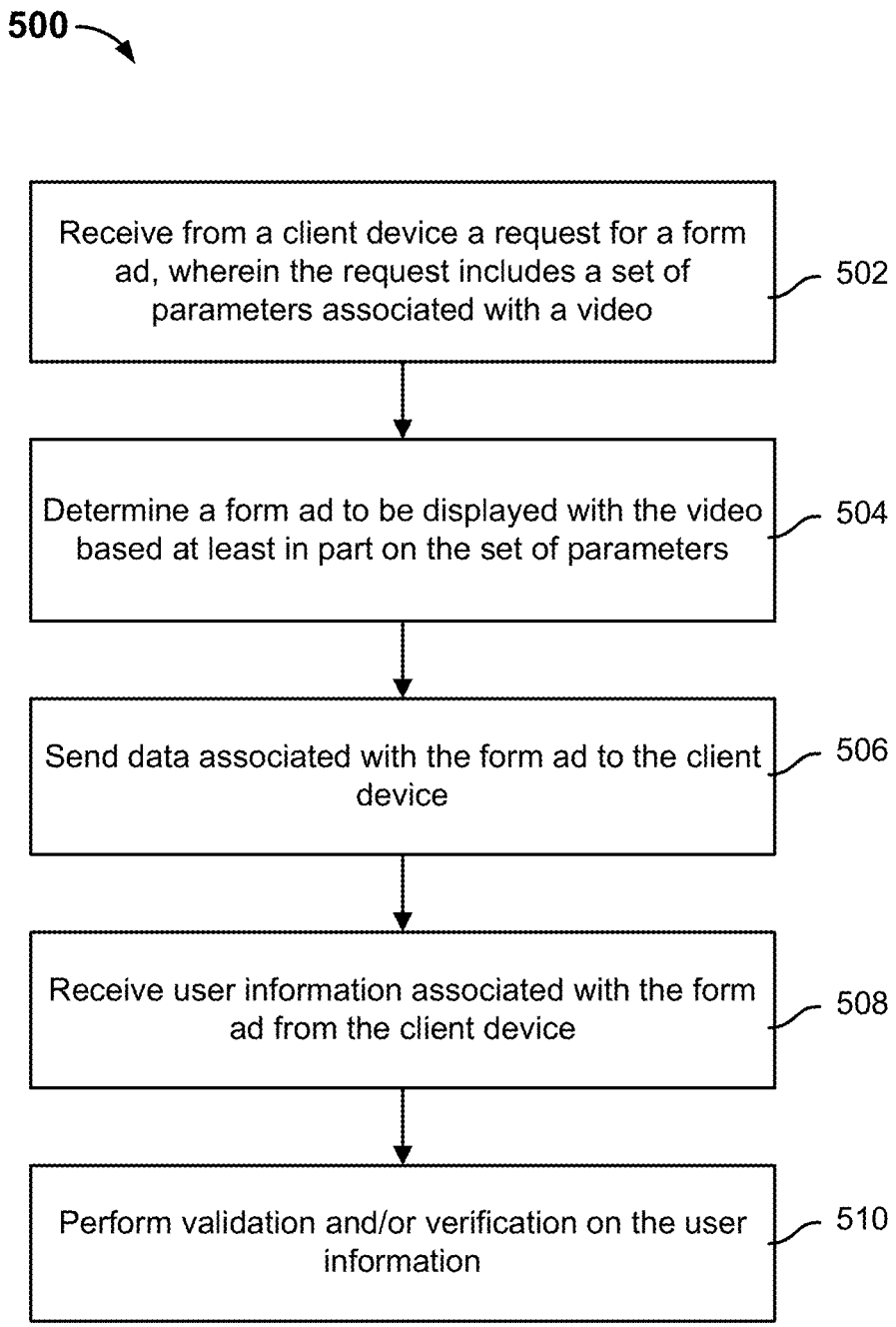
FIG. 5 is a flow diagram showing an embodiment of a process for serving form ads with a video.

FIG. 5 is a flow diagram showing an embodiment of a process for serving form ads with a video. In some embodiments, process 500 is performed at system 100 of FIG. 1. For example, process 500 is performed by one or more of video ad server 110, content delivery network 108, and form ad server 106 of system 100.

At 502, a request for a form ad is received, wherein the request includes a set of parameters associated with a video. In some embodiments, the request for a form ad is generated and sent by a video player application and/or another application that resides at the client device. The set of parameters includes data associated with the video, data associated with the client device, data associated with the video player, data associated with the user interaction with the video, and/or data associated with the geographic location of the user, for example.

At 504, a form ad to be displayed with the video is determined based at least in part on the set of parameters. In some embodiments, the appropriate form ad is determined for the request based on determining user intent based on the set of parameters and determining a best matching form ad based on the metadata associated with the form ads. In some embodiments, the appropriate form ad is determined for the request based on categorizing the viewing user into a user demographic and determining a best matching form ad for that user demographic. In some embodiments, the appropriate form ad is determined for the request based on selecting a form ad that is currently popular. In some embodiments, the appropriate form ad is determined for the request based on determining a category associated with the video and selecting a form ad that is associated with that category of videos. In some embodiments, the appropriate form ad is determined for the request based on determining a tag word or keyword associated with the video and selecting a form ad that is associated with the same or similar tag word or keyword.

At 506, data associated with the form ad is sent to the client device. In some embodiments, the determined form ad is sent directly to the client device. In some embodiments, identifying information that may be used by the client device to locate the determined form ad is sent to the client device.

At 508, user information associated with the form ad is received from the client device. After the client device obtained and displayed the obtained form ad with the video, the viewing user may input user information through the form ad.

At 510, validation and/or verification are performed on the user information. The input user information is validated (e.g., the user information is checked for whether it is in the correct format) and/or also verified (e.g., the user information is checked for whether it can be verified by a third party verification service) prior to being classified as a lead that is eligible to be sold to a potential buyer (e.g., an advertiser). Validation and verification are performed to ensure that only quality and truthful user information is sold to potential buyers.

Figure 6:
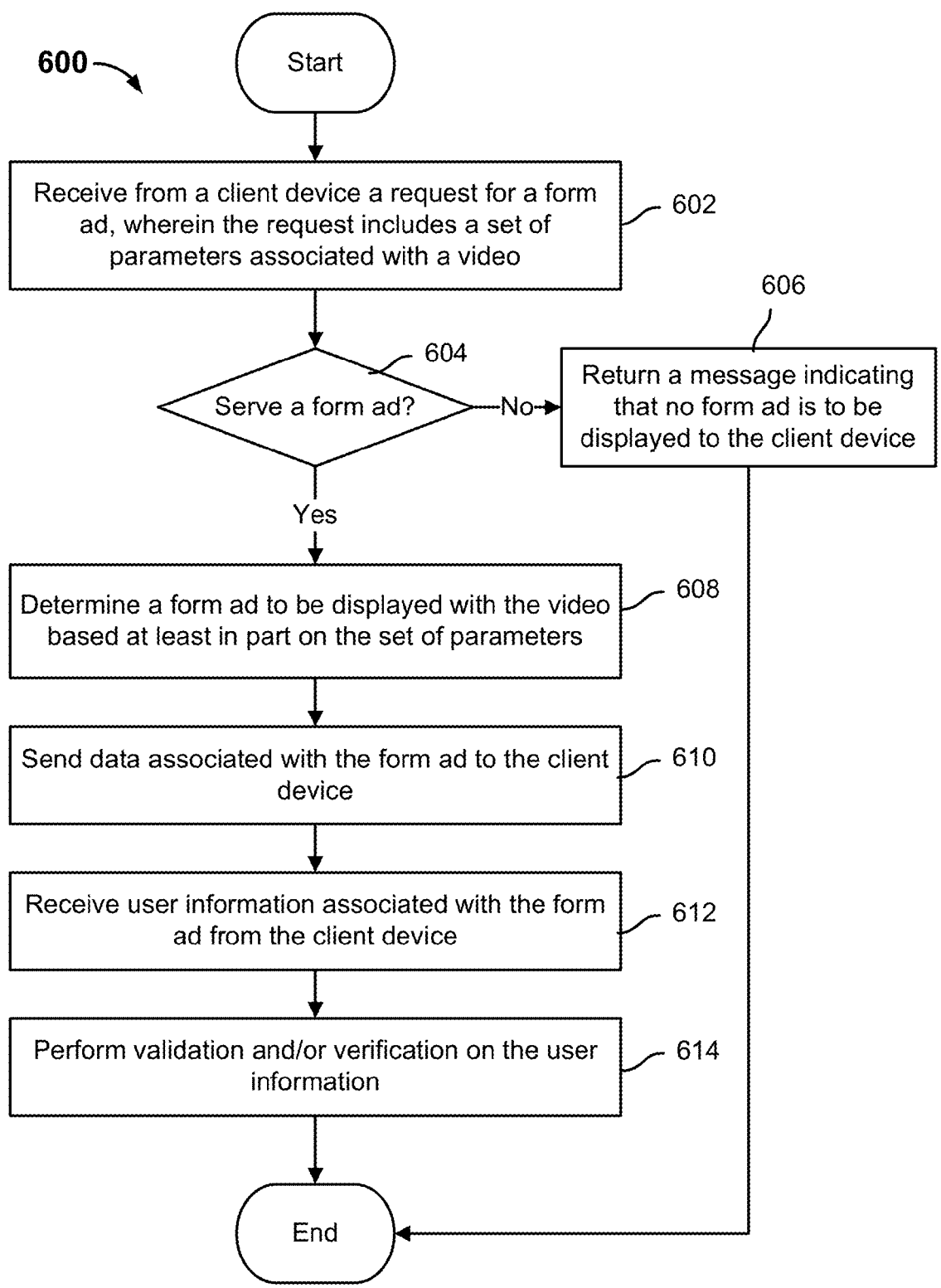
FIG. 6 is a flow diagram showing an embodiment of a process of serving form ads with a video.

FIG. 6 is a flow diagram showing an embodiment of a process of serving form ads with a video. In some embodiments, process 600 is performed at system 100 of FIG. 1. For example, process 600 is performed by one or more of video ad server 110, content delivery network 108, and form ad server 106 of system 100.

Process 600 is similar to process 500 of FIG. 5 except with the additional preliminary determination of whether a form ad should or can be served at all. As will be described below, if it is determined that a form ad will not be served, then a message indicating that no form ad is to be displayed is returned to the client device and the client device will understand that a form ad will not be served with the video. However, if it is determined that a form ad will be served, then the determination of the appropriate form ad and the validation and/or verification of the input user information may be performed using techniques similar to those described for process 500 of FIG. 5.

At 602, a request for a form ad is received, wherein the request includes a set of parameters associated with a video.

At 604, it is determined whether a form ad is to be served. In some scenarios, it is determined to not serve a form ad because the viewing user is unlikely to interact with the form ad. For example, if it is determined that the user interaction included in the received set of parameters indicates that the user has not been engaging with the ads presented with the video so far (e.g., the user has dismissed every ad that has been presented with the video so far), then it is presumed that the user would not interact with the form ad and a form ad is determined not to be served. In a specific example, a threshold can be set with respect to the detected user interaction such that if the user interaction does not exceed a threshold of activity that is associated with potential interest in interacting with a form ad, then a form ad is determined not to be served. The threshold may be that if the user dismisses at least 50% of the other ads that have been shown for the user, then a form ad is determined not to be served. In another example, if no matching form ad can be determined for the set of parameters, then a form ad is determined not to be served.

In the event that a form ad is not determined to be served, control passes to 606. In the event that a form ad is determined to be served, control passes to 608.

At 606, a message indicating that no form ad is to be displayed is returned to the client device. Due to the determination to not serve a form ad, a message indicating that no form ad is to be displayed is sent to the client device so that the client device is notified that a form ad will not be presented. As such, the process ends.

At 608, a form ad to be displayed with the video is determined based at least in part on the set of parameters.

At 610, data associated with the form ad is sent to the client device.

At 612, user information associated with the form ad is received from the client device.

At 614, validation and/or verification are performed on the user information.

Figure 7:
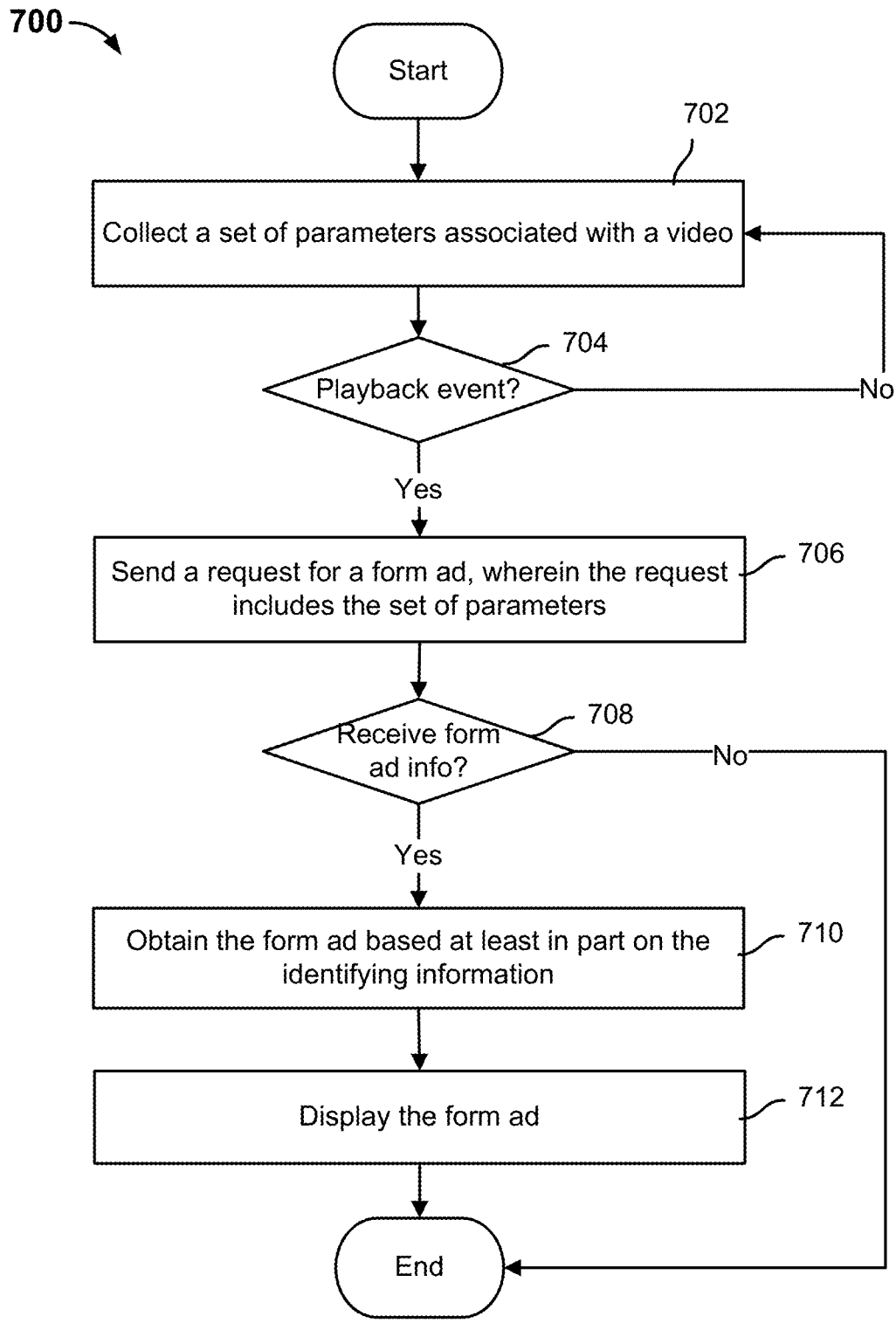
FIG. 7 is a flow diagram showing an embodiment of a process for serving form ads with a video.

FIG. 7 is a flow diagram showing an embodiment of a process for serving form ads with a video. In some embodiments, process 700 is performed at system 100 of FIG. 1. For example, process 700 is performed by client device 102 of system 100.

At 702, a set of parameters associated with a video is collected. In some embodiments, a video player application and/or another application (e.g., the web browser application) that resides on the client device collects the set of parameters prior to, during, and/or subsequent to the playback of the video.

At 704, it is determined whether a playback event associated with transmitting of the set of parameters is detected. In the event that the playback event is detected, control passes to 704. Otherwise, control returns to 702. For example, certain playback events may be configured to trigger the transmission of the request for a form ad. Examples of such playback events include a user selection to pause the playback of the video and/or the completion of the video playback. However, if such a playback event is not detected, then control returns to 702 and more parameters are collected.

At 706, a request for a form ad is sent, wherein the request includes the set of parameters. The request for the form ad includes the set of parameters collected so far (up until the detection of the playback event). In some embodiments, the request for the form ad is sent to a video ad server.

At 708, it is determined whether identifying information associated with a selected form ad is received. In the event that identifying information associated with a form ad is received, then control proceeds to 710. For example, the identifying information may include a URL or another piece of identifying information that can be used to identify the selected form ad. Otherwise, in the event that identifying information associated with a form ad is not received but a message indicating that no form ad is to be displayed is received instead, then a form ad will not be displayed and the process ends.

At 710, the form ad is obtained based at least in part on the identifying information. Obtaining the form ad includes querying a content delivery network (or another type of storage for form ads) for the form ad based on the received identifying information.

At 712, the form ad is displayed. In various embodiments, the form ad is displayed as an overlay over at least a portion of the video or video player. In some embodiments, the form ad is displayed at another area at the webpage and/or application associated with the video that is not over a portion of the video. In the event that the detected playback event at 704 was a user selection to pause the video, the form ad may remain displayed until a user selection to resume the video is received or a user selection to dismiss the form ad is received. In the event that the detected playback event at 704 was the completion of the video playback, the form ad may remain displayed until a user selection to dismiss the form ad is received.

Figure 8:
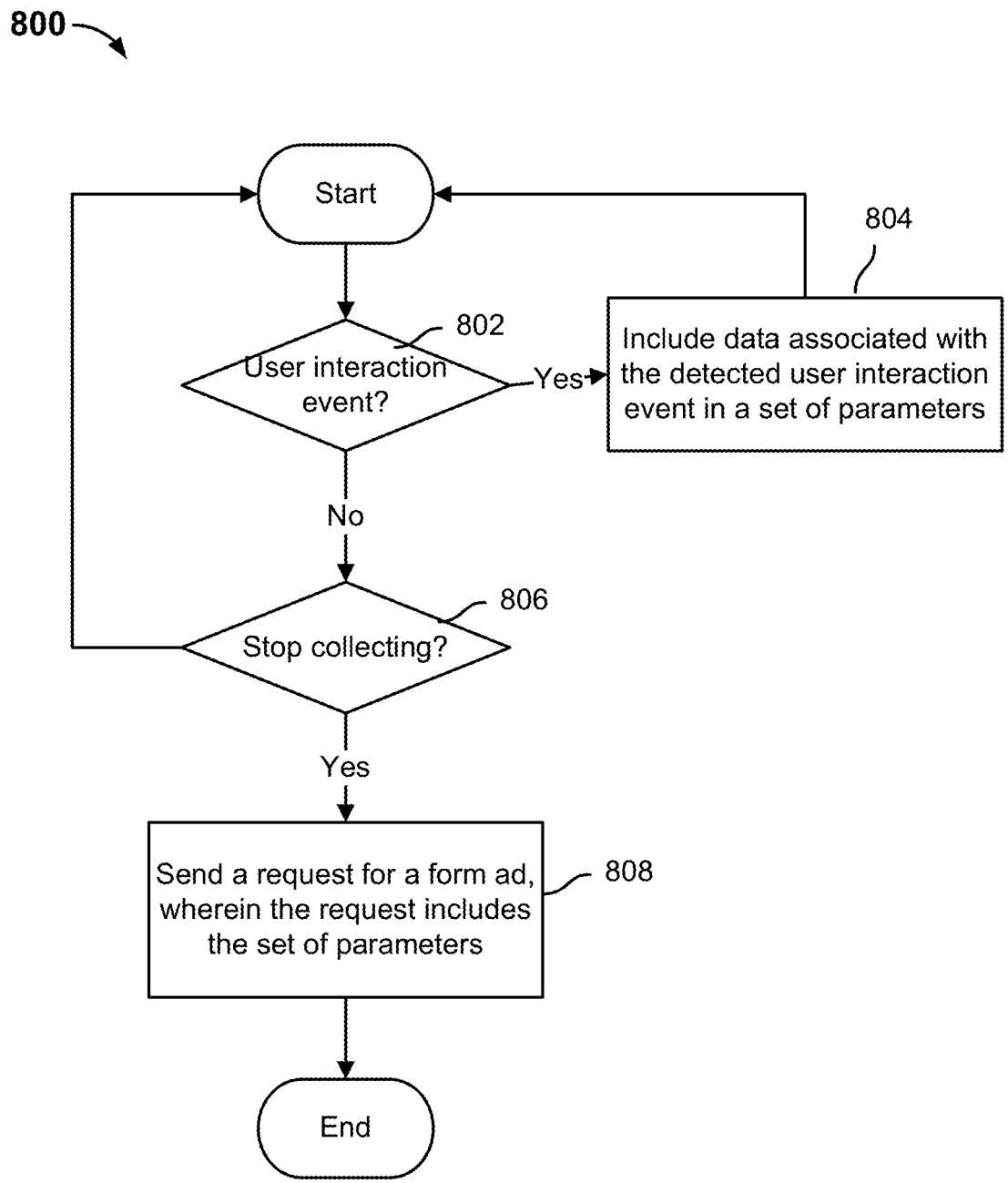
FIG. 8 is a flow diagram showing an embodiment of a process for collecting user interaction events.

FIG. 8 is a flow diagram showing an embodiment of a process for collecting user interaction events. In some embodiments, process 800 is implemented at system 100 of FIG. 1. For example, process 800 is implemented at client device 102 of system 100.

Process 800 illustrates an example of collecting user interaction events, which are parameters to be included in the set to be sent with a request for a form ad, at the client device. A user interaction event may comprise any interaction that the user has with respect to the webpage and/or application associated with the video, any selectable elements that are displayed at the webpage and/or application associated with the video (e.g., companion video ads, overlaying video ads, banner ads), the video player, and/or the video playback. Examples of a user interaction event is a user selection of a displayed ad at the webpage and/or application associated with the video, a user dismissal of a displayed ad at the webpage and/or application associated with the video, a user selection of a playback control button associated with the video player, a user submission of feedback (e.g., a user comment, a review of the video) associated with the video, and a cursor movement to a different area of the video and/or the webpage and/or application associated with the video. As described above, in some embodiments, parameters such as user interaction events may be used in determining whether a form ad will be served with a video at all and if it is determined that a form ad is determined to be served, which form ad to serve.

At 802, it is determined whether a user interaction event is detected. In the event that a user interaction event is detected, control passes to 804. Otherwise, control passes to 806. In some embodiments, the user interaction event is detected by the video player application, the web browser application, and/or another application installed at the client device. At 804, data associated with the detected user interaction event is included in a set of parameters. After 804, process 800 begins again. At 806, it is determined whether to stop collecting parameters. The collection of parameters may be stopped if a playback event that is associated with sending a request for a form ad is detected. In the event that it is determined that the collection of parameters should stopped, then control passes to 808. For example, if the most recently detected user interaction event is a user selection to pause the video playback, then that playback event may trigger the sending of the set of parameters. In another example, if it is detected that the video playback has reached the end of the video, then that playback event may trigger the sending of the set of parameters. At 808, a request for a form ad is sent, wherein the request includes the set of parameters. The set of parameters that have been collected so far is sent with the request for a form ad.

In some scenarios, after 808, more parameters may be collected and included in a subsequent request for a form ad. For example, if at 806, it is determined to stop collecting parameters because a user selection to pause the video playback has been received, then after the user resumes the playback of the video, process 800 may begin again, where new user interaction events may be added to the set collected prior to the user selection to pause the video. As such, when 808 is reached again, an updated set of parameters may be sent and used to select a different form ad to be displayed with the video.

Figure 9A:
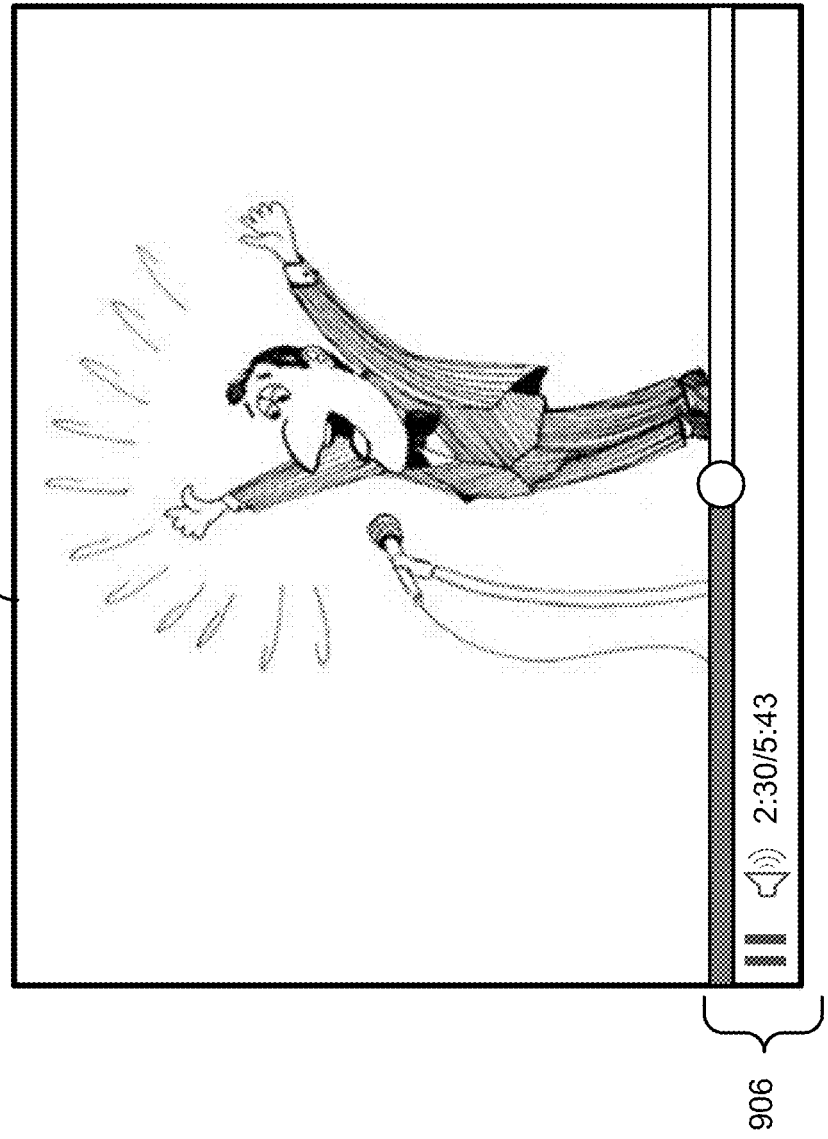
FIG. 9A is a diagram showing an example of a video playing in a video player application.

FIG. 9A is a diagram showing an example of a video playing in a video player application. For example, the video player application may be embedded in an application associated with the online video platform or at a webpage associated with the online video platform. In the example, the online video platform is called "VideoSite." The video may be played back on a computer or on a mobile device. The example shows video player application 902 playing a video titled "Jimmy Yallon—Comedy Center Stand-Up Special." Player controls 906 represent a user interface where the viewing user may view the current progress of the video (2:30/5:43 minutes) and select different icons (e.g., the pause icon and the sound icon) to adjust the playback of the video. The user may interact with the video and/or other elements associated with the webpage/application using a cursor (not shown) or by using an input tool (e.g., a human finger, a stylus) on the screen associated with the client device. The user's interactions with the video and/or webpage/application may be recorded by video player application 902 and sent with a set of parameters to a video ad server when a certain playback event that is configured to trigger the transmission is detected. One such playback event is a user selection to pause the video. In the example, assume that the user selects the pause icon in player controls 906 two minutes and 30 seconds into the video playback. Thus, in response to the user's selection to pause the video, a collected set of parameters (e.g., including recorded user interactions with the video and/or webpage/application up until two minutes and 30 seconds into the video playback) is sent to the video ad server with a request for a form ad.

Figure 9B:
FIG. 9B is a diagram showing an example of a form ad being displayed over a video in a video player application.

FIG. 9B is a diagram showing an example of a form ad being displayed over a video in a video player application. The example of the presentation of form ad 952 in FIG. 9B may be made in response to the user selection to pause the video as described with FIG. 9A. As indicated by the appearance of the play icon in player controls 956, the video is currently paused. As described above, in response to the user selection to pause the video, the collected set of parameters was sent along with a request for a form ad by the client device to a video ad server. For example, the set of parameters includes keywords associated with the video such as "Jimmy Yallon" and "Comedy Center"; the category of comedy; information indicating the client device is a desktop computer; information indicating that the viewing user had interacted with a video ad that was played before the Jimmy Yallon video started, and information associated with the user indicating that the viewing user is male user who is 27 years old. Based on the set of the set of parameters, the video ad server determined that a form ad was to be served and sent back to the client device. In the example, the form ad selected to be displayed with the video is form ad 952. As shown in the example, form ad 952 is displayed over the "Jimmy Yallon—Comedy Center Stand-Up Special" video in the video player application. In the example, form ad 952 may have been selected based on at least some of the information included in the set of parameters. For example, form ad 952 is stored with metadata such as the target user demographic being male and aged 25-40; the keywords such as "Jimmy Yallon" and "Comedy Center"; and that characteristic that the form ad is to be optimized for desktop or laptop computers. The video ad server may select to serve form ad 952 from a candidate group of form ads (e.g., that are associated with the category of comedy) based on determining that the set of parameters best matches the metadata associated with form ad 952 of any other candidate form ad. Form ad 952 invites the user to input his current zip code and email address so that the user may receive email alerts when a Jimmy Yallon show is to take place in a location near the zip code provided in the form ad. To submit the entered user information (zip code and email), the user is to select the "Submit" button displayed in form ad 952. In some embodiments, prior to classifying the submitted user information as a lead, the user information is validated and/or verified and only if the user information meets the validation and/or verification criteria, is the user information classified as a lead and potentially sold to a buyer. In some embodiments, after the user information is submitted, a landing page associated with the form ad is open (e.g., in a new window) in a web browser application. In the example, the landing page that could be opened may include a list of tour dates and locations for the comedian Jimmy Yallon that are near the zip code provided in the submitted user information.

Form ad 952 may remain displayed at the webpage and/or application associated with the video until the user selects the dismiss icon "X" located on the top right hand corner of the ad or until the user selects to resume video playback by selecting the play icon within player controls 956. Displaying the form ad over the video while the video is paused (or completed) provides the user the opportunity to see the form ad and also to complete the form ad without distraction to the user's experience of viewing of the video.

While the example shows a form ad being served while a playback of a video is paused, a form ad may additionally or alternatively be served at the completion of a video playback.

Figure 10:
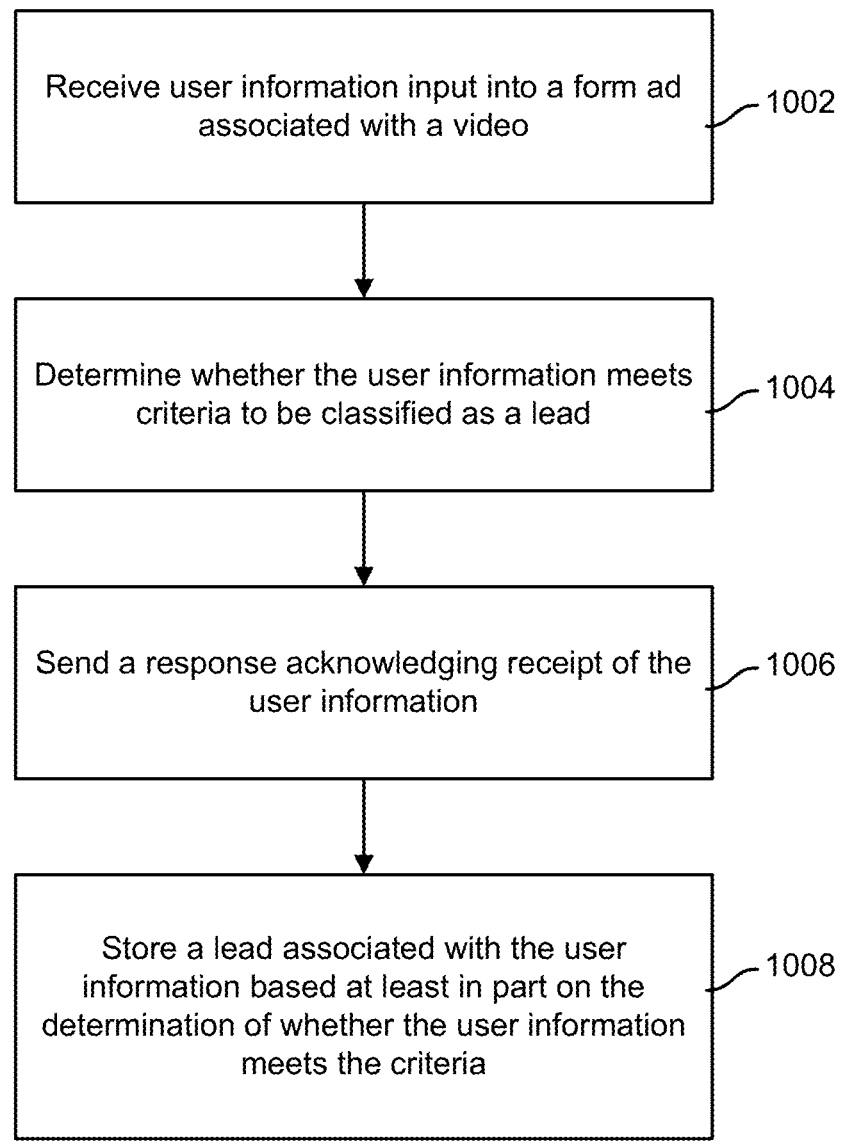
FIG. 10 is a flow diagram showing an embodiment of a process for collecting user information using a form ad displayed with a video.

FIG. 10 is a flow diagram showing an embodiment of a process for collecting user information using a form ad displayed with a video. In some embodiments, process 1000 may be implemented at system 100 of FIG. 1. For example, process 1000 is implemented by form ad server 106 of FIG. 1. In some embodiments, 612 and 614 of process 600 may be implemented, at least in part, by process 1000.

At 1002, user information input into a form ad associated with a video is received. In some embodiments, the form ad is included in a webpage and/or application associated with the video. In some embodiments, the form ad is included in a mobile device optimized software application associated with playing videos. User information may be input by a user (e.g., the user who is viewing the video) into the one or more fields and/or other selections included in the form ad. For example, user information may include values, selections (e.g., of menu items), and/or alphanumeric characters.

At 1004, it is determined whether the user information meets criteria to be classified as a lead. In some embodiments, the user information may be checked to determine whether it meets the criteria that are required for user information to be classified as a lead. In some embodiments, the criteria may comprise rules for one or both of validation and verification of the user information. In some embodiments, the criteria that are required for user information received through a form ad to be classified as a lead are determined from the set of metadata stored for the form ad.

At 1006, a response acknowledging receipt of the user information is sent. In some embodiments, a response acknowledging receipt is sent in response to a selection to submit the user information (e.g., to indicate the completion of inputting user information). In some embodiments, the response is sent regardless of whether the user information has been determined to meet the criteria to be classified as a lead. In some embodiments, the response may include a message to be dynamically presented at the webpage and/or application associated with the video in the ad unit at which the form ad was displayed (e.g., a region of the webpage/application interface originally associated with the form ad). In some embodiments, the response may include a direction to a landing page presented at a new window different than the webpage and/or application associated with the video.

At 1008, a lead associated with the user information is stored based at least in part on the determination of whether the user information meets the criteria. In some embodiments, validation is performed on the user information based on the rules included in the criteria that are required for user information received through a form ad to be classified as a lead. In some embodiments, only user information that is successfully validated is then verified. In some embodiments, if the user information cannot be successfully validated, a prompt is sent to invite the user to resubmit information. In some embodiments, if the user information cannot be successfully validated (e.g., over a threshold count of user information resubmissions), then the user information is not verified nor stored as a lead. In some embodiments, once the user information is successfully validated, it proceeds to the verification process. In some embodiments, verification of the user information is performed at least in part by a third party. In some embodiments, if the user information cannot be successfully verified (e.g., based on a verification result message received from the third party verification service), a prompt is sent to invite the user to resubmit information. In some embodiments, if the user information cannot be successfully verified (e.g., over a threshold count of user information resubmissions), then the user information is not stored as a lead. In some embodiments, if the user information is both successfully validated and successfully verified, then the user information is stored as a lead. In some embodiments, periodically, a stored lead is compared against one or more sets of purchase criteria associated with buyers and leads that match the purchase criteria of a buyer may be sold (e.g., billed) to that buyer.

Figure 11:
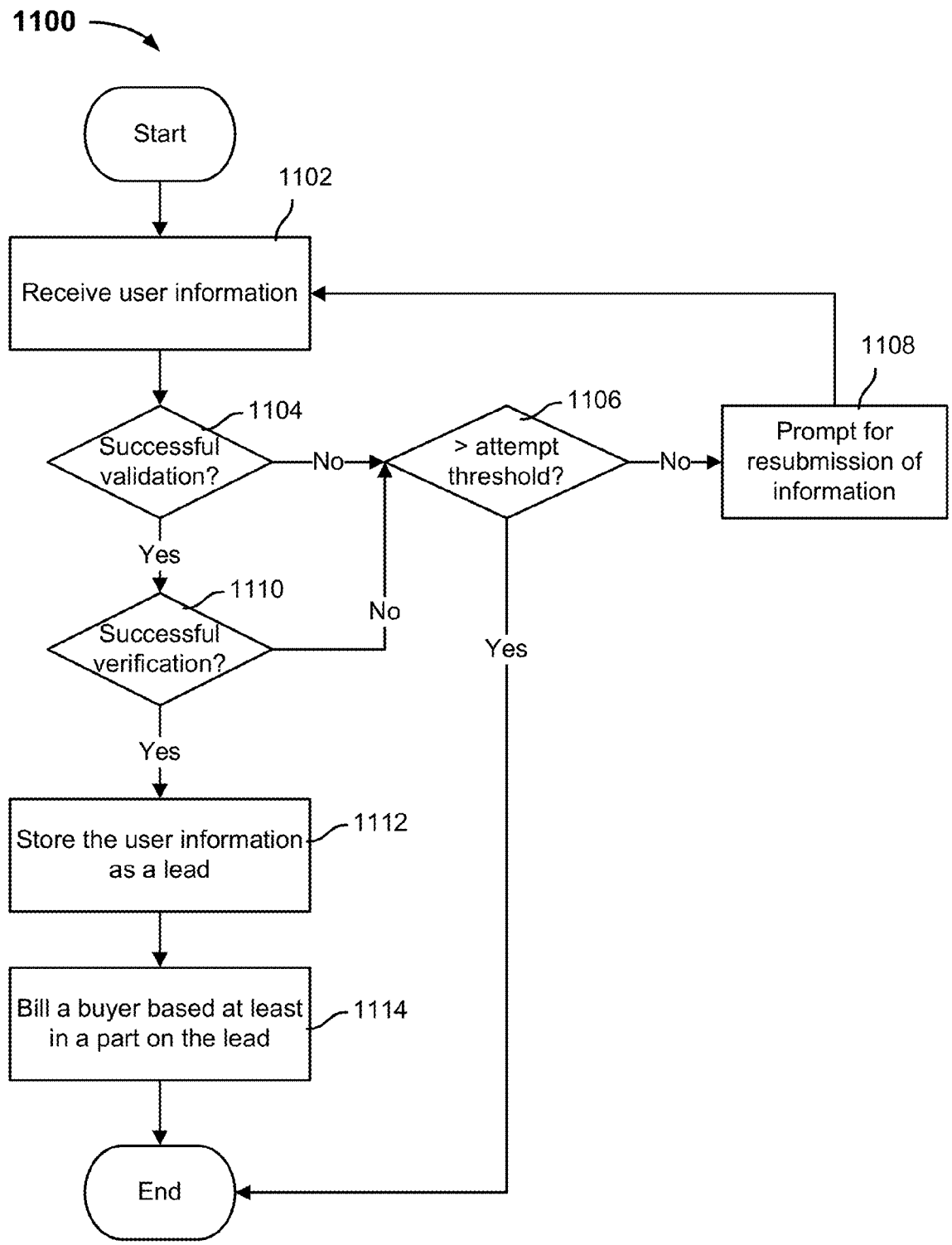
FIG. 11 is a flow diagram showing an example of a process for performing validation and verification on the received user information input into a form ad displayed with a video.

FIG. 11 is a flow diagram showing an example of a process for performing validation and verification on the received user information input into a form ad displayed with a video. In some embodiments, process 1100 is implemented at system 100 of FIG. 1. In some embodiments, process 1000 of FIG. 10 is implemented, at least in part, using process 1100.

At 1102, user information is received. The user information is input into fields and/or selections of a form ad displayed with a video. At 1104, it is determined whether the validation is successful. In some embodiments, validation (e.g., checking the user information based on rules for appropriate format and/or type) is performed on the user information. In some embodiments, validation may begin to be performed on the user information received so far in response to a trigger event. For example, trigger events may include the user's cursors moving away from a field of the form ad, the user's completion of a field or selection of the form ad, or the user's selection of the submission button of the form ad. In the event the validation was not successful, a count associated with the number of failed validations/verifications is incremented by one and control passes to 1106. At 1106, it is determined whether the updated count has exceeded a predetermined attempt threshold. For example, the attempt threshold may be included in rules for validation and verification stored for the form ad with the criteria that are required for user information received through a form ad to be classified as a lead. In the event that the attempt threshold is not exceeded, then control passes to 1108. At 1108, a prompt for resubmission of information is presented to the user. In some embodiments, the prompt is associated with fields whose input information need to be resubmitted (e.g., because the previously submitted information cannot be successfully validated). After 1108, control returns to 1102. In the event that the attempt threshold of 1106 is exceeded, then process 1100 ends and the user information is not stored as a lead. In the event the validation was successful at 1104, control passes to 1110. At 1110, it is determined whether the user information can be successfully verified. In some embodiments, the user information may be verified using a third party verification service. In the event that verification was not successful, a count associated with the number of failed validations/verifications is incremented by one and control passes to 1106. In the event the verification was successful at 1110, control passes to 1112. At 1112, the set of user information is stored as a lead. In some embodiments, if an acknowledgement message has not already been sent to the user, the acknowledgement message is sent to the user once the user information is stored as a lead. At 1114, a buyer associated with purchase criteria of the lead that are met is billed.

Figure 12:
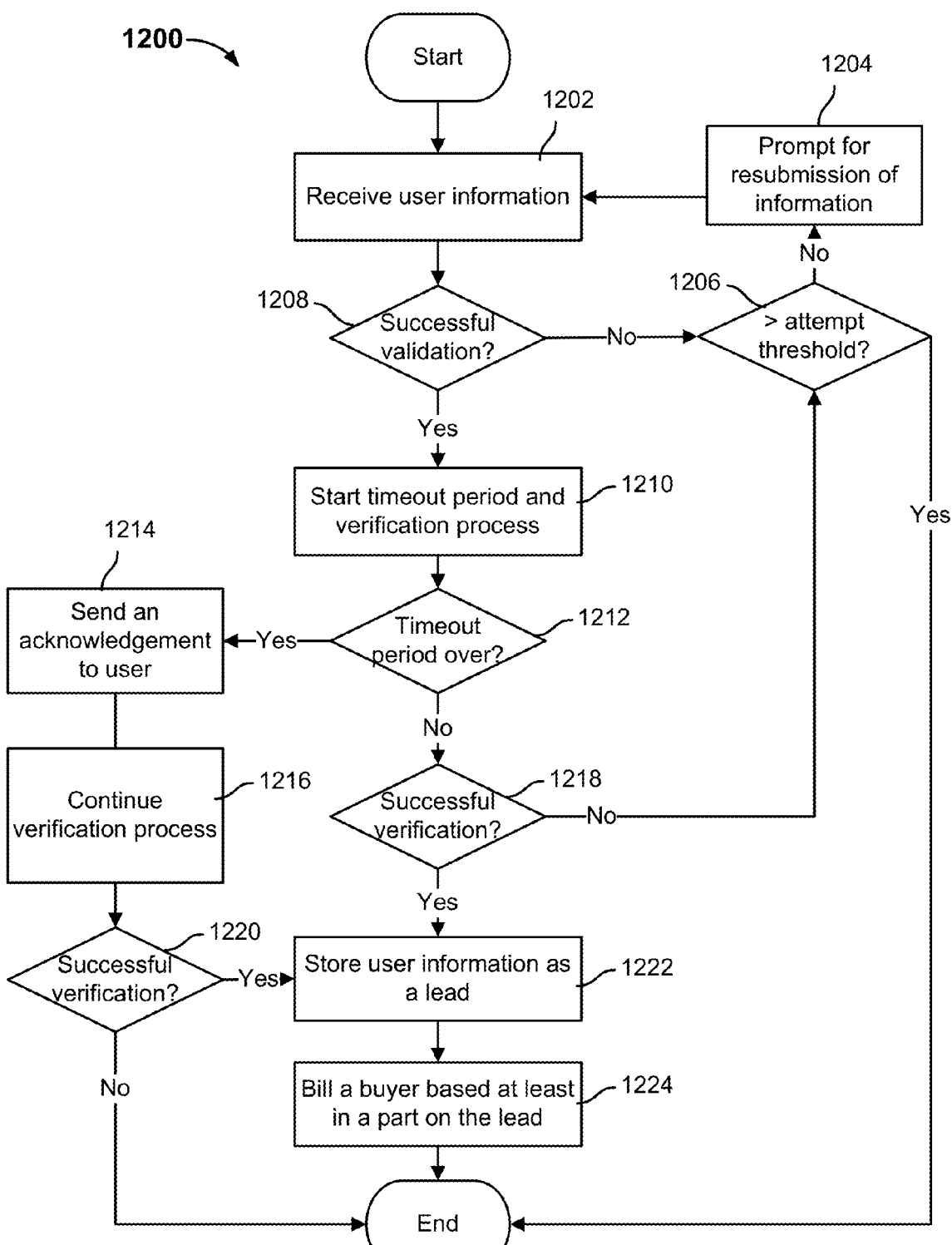
FIG. 12 is a flow diagram showing an example of a process for performing validation and verification on the received user information input into a form ad displayed with a video.

FIG. 12 is a flow diagram showing an example of a process for performing validation and verification on the received user information input into a form ad displayed with a video. In some embodiments, process 1200 is implemented at system 100 of FIG. 1. In some embodiments, process 1000 of FIG. 1 is implemented, at least in part, using process 1200.

Process 1200 is similar to process 1100 except that process 1200 includes a timeout period associated with waiting to receive results of the verification process (e.g., that may be performed by a third party verification service) such that if the verification process takes too long (i.e., beyond the timeout period), then an acknowledgement message (e.g., a message indicating confirmation that the user information has been received) can be sent to the user in a relatively timely manner even though the verification process has not yet been completed. Furthermore, even after the acknowledgement message is sent, the verification result message may be waited on until such a message is received so that it can be used to determine whether the user information should be stored as a lead.

At 1202, user information is received. The user information is input into fields and/or selections of a form ad displayed with a video. At 1208, it is determined whether the validation is successful. In the event the validation was not successful, a count associated with the number of failed validations/verifications is incremented by one and control passes to 1206. At 1206, it is determined whether the updated count has exceeded a predetermined attempt threshold. In the event that the attempt threshold is not exceeded, then control passes to 1204. At 1204, a prompt for resubmission of information is presented to the user. After 1204, control returns to 1202. In the event that the attempt threshold of 1206 is exceeded, process 1200 ends and the user information is not stored as a lead. In the event the validation was successful at 1208, control passes to 1210. At 1210, a timeout period is started. In some embodiments, a timeout period is configured when a verification process (e.g., in the set of metadata for the form ad) is started. In some embodiments, starting a verification process includes sending the user information to one or more third party verification services. One reason for using a timeout period is because the verification process may take a nontrivial length of time because the one or more third party services that are performing the verification process may need to compare the user information against a voluminous amount of data. So by using the timeout period, it can be determined when an acknowledgement message is to be sent to the user regardless of whether the verification process has completed. At 1212, it is determined whether the timeout period is over (i.e., has completed/elapsed). In the event that the timeout period is not over, control passes to 1218. At 1218, it is determined whether the user information can be successfully verified. In some embodiments, whether the user information can be successfully verified is determined based on a verification results message sent from a third party verification service. If such a message has been received and it is determined that the user information cannot be successfully verified, then control passes to 1206. Otherwise, in the event that the user information can be successfully verified, control passes to 1222 and the user information is stored as a lead. In some embodiments, if an acknowledgement message has not already been sent to the user, the acknowledgement message is sent to the user once the user information is stored as a lead. Then at 1224, a buyer associated with purchase criteria of the lead that are met is billed. Returning to 1212, in the event that the timeout period is over, control passes to 1214. At 1214, an acknowledgment message is sent to the user. At 1216, verification process is continued. In some embodiments, to continue the verification process includes waiting to receive the verification results message sent from a third party verification service despite having already sent the acknowledgement message. At 1220, it is determined whether the user information can be successfully verified (e.g., based on the verification results message received from the third party verification service). In the event that such a message has been received and it is determined that the user information cannot be successfully verified, then process 1200 ends and a prompt for resubmission is not sent because the acknowledgment message has already been sent. In the event that such a message has been received and it is determined that the user information can be successfully verified, then control passes to 1222.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for serving form ads with videos, comprising:
a processor configured to:
   receive from a client device a request including a set of parameters associated with a video, wherein the request is configured to be sent in response to detection of a playback event associated with the video;
   determine a form ad to be displayed with the video based at least in part on the set of parameters;
   receive user information input into the form ad;
   determine whether the user information meets criteria associated with at least one of validation and verification; and
   in the event that the criteria are met, classify the user information as a lead; and
a memory coupled to the processor and configured to provide the processor with instructions.

2. The system of claim 1, wherein the set of parameters includes one or more of the following: data associated with a user associated with a selection to view the video, data associated with the video, data associated with the client device, data associated with a video player associated with providing playback of the video, data associated with user interaction with the video, and/or data associated with a geographic location of the user.

3. The system of claim 1, wherein at least a subset of the set of parameters is associated with being collected by a video player application.

4. The system of claim 1, wherein the set of parameters includes one or more user interaction events associated with the video.

5. The system of claim 4, wherein prior to determining the form ad to be displayed with the video, the processor is further configured to determine that the form ad should be displayed based at least in part on the one or more user interaction events.

6. The system of claim 5, wherein the one or more user interaction events includes a user interaction event associated with an ad displayed with the video.

7. The system of claim 1, wherein to determine the form ad includes to determine a user intent based at least in part on the set of parameters and to determine a form ad that best matches the user intent based on metadata associated with that form ad.

8. The system of claim 1, wherein to determine the form ad includes to determine a user demographic associated with a user associated with a selection to view the video and to determine a form ad that is associated with the user demographic.

9. The system of claim 1, wherein the playback event comprises a user selection to pause a playback of the video.

10. The system of claim 1, wherein the playback event comprises a completion of a playback of the video.

11. The system of claim 1, wherein the processor is further configured to send data associated with the form ad to the client device.

12. A system for serving form ads with videos, comprising:
a processor configured to:
receive from a client device a request including a set of parameters associated with a video; and
determine a form ad to be displayed with the video based at least in part on the set of parameters, wherein to determine the form ad includes to determine a form ad that is currently popular; and
a memory coupled to the processor and configured to provide the processor with instructions.

13. A system for serving form ads with videos, comprising:
a processor configured to:
receive from a client device a request including a set of parameters associated with a video;
determine a form ad to be displayed with the video based at least in part on the set of parameters;
receive user information input into the form ad;
determine whether the user information meets criteria associated with at least one of validation and verification; and
in the event that the criteria are met, classify the user information as a lead; and
a memory coupled to the processor and configured to provide the processor with instructions.

14. A method for serving form ads with videos, comprising:
receiving from a client device a request including a set of parameters associated with a video, wherein the request is configured to be sent in response to detection of a playback event associated with the video;
determining a form ad to be displayed with the video based at least in part on the set of parameters;
receiving user information input into the form ad;
determining whether the user information meets criteria associated with at least one of validation and verification; and
in the event that the criteria are met, classifying the user information as a lead.

15. The method of claim 14, wherein the set of parameters includes one or more user interaction events associated with the video.

16. The method of claim 15, wherein prior to determining the form ad to be displayed with the video, determining that the form ad should be displayed based at least in part on the one or more user interaction events.

17. The method of claim 16, wherein the one or more user interaction events includes a user interaction event associated with an ad displayed with the video.

18. The method of claim 14, wherein the playback event comprises a user selection to pause a playback of the video.

19. The method of claim 14, wherein the playback event comprises a completion of a playback of the video.

20. A computer program product for serving form ads with videos, the computer program product being embodied in a non-transitory computer readable storage medium and comprising computer instructions for:
receiving from a client device a request including a set of parameters associated with a video, wherein the request is configured to be sent in response to detection of a playback event associated with the video;
determining a form ad to be displayed with the video based at least in part on the set of parameters;
receiving user information input into the form ad;
determining whether the user information meets criteria associated with at least one of validation and verification; and
in the event that the criteria are met, classifying the user information as a lead.

* * * * *